United States Patent [19]

Tomori

[11] Patent Number: 4,523,815
[45] Date of Patent: Jun. 18, 1985

[54] ZOOM LENS BARREL FOR MACROFOCUSING

[75] Inventor: Yasumasa Tomori, Sakadoshi, Japan

[73] Assignee: Asahi Kogaku Kogyo Kabushiki Kaisha, Tokyo, Japan

[21] Appl. No.: 510,457

[22] Filed: Jul. 1, 1983

[30] Foreign Application Priority Data

Jul. 27, 1982 [JP] Japan ............................. 57-113529[U]

[51] Int. Cl.³ ................................................ G02B 7/10
[52] U.S. Cl. ..................................................... 350/430
[58] Field of Search ......................................... 350/430

[56] References Cited

FOREIGN PATENT DOCUMENTS

| 50119818 | 4/1977 | Japan . |
| 5497766 | 2/1981 | Japan . |
| 54108911 | 4/1981 | Japan . |
| 54131126 | 5/1981 | Japan . |
| 54161871 | 7/1981 | Japan . |

Primary Examiner—John K. Corbin
Assistant Examiner—Paul Dzierzynski
Attorney, Agent, or Firm—Flynn, Thiel, Boutell & Tanis

[57] ABSTRACT

A zoom lens barrel capable of macro-photographing, having lens assemblies with a focusing lens assembly has a mount ring, a zooming ring and a focusing ring. The barrel further comprises a guide means between the mount ring and the focusing ring for enabling the focusing ring not only to rotate for normal photographing, and for macro-photographing, but also to move in the axial direction, a connecting ring which rotates to move only the focusing lens assembly, a macrohelicoid ring which rotates to move the whole lens assemblies while maintaining a predetermined spatial relationship therebetween, and a switching means for selectively connecting the connecting ring or the macrohelicoid ring to the focusing ring in accordance with the axial movement of the focusing ring.

10 Claims, 8 Drawing Figures

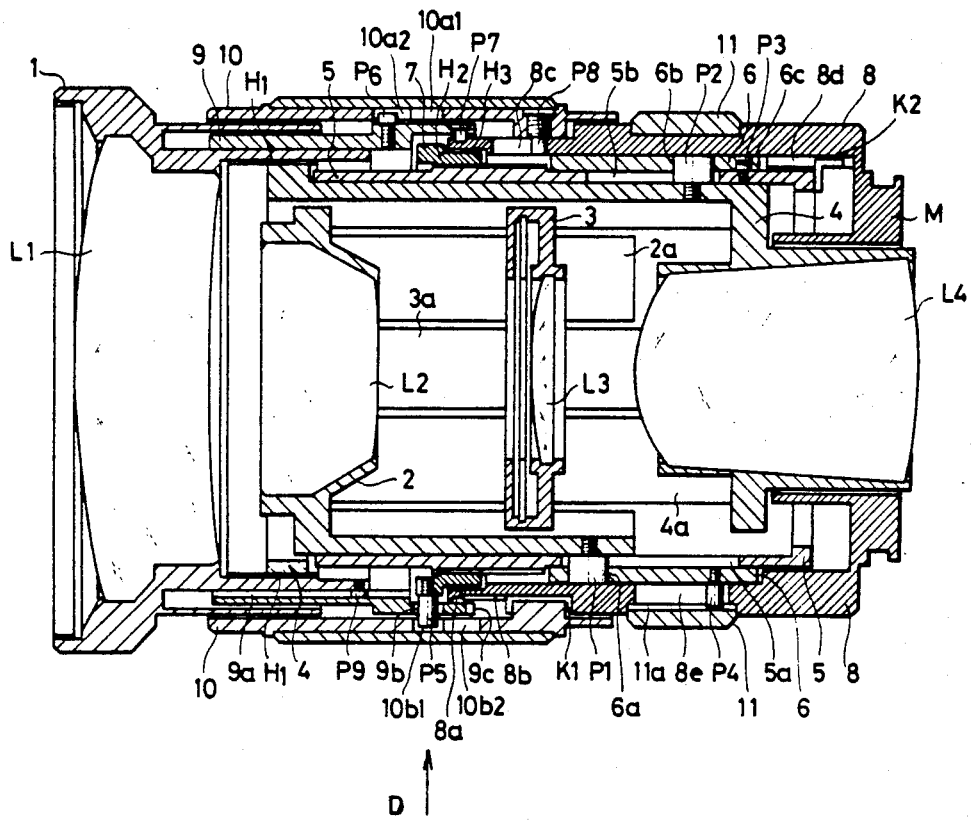
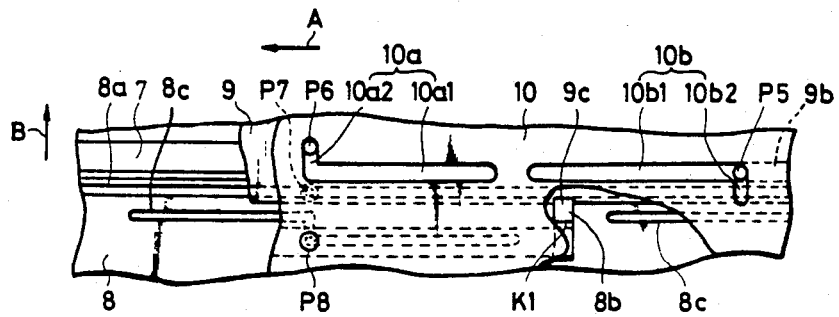

ZOOM LENS BARREL FOR MACROFOCUSING

This invention relates to a zoom lens barrel having a macro photographing function.

Recently, zoom lenses having a macro photographing function have been used and various kinds of lens barrels enabling macro photographing have been proposed. One of the most important technical problems of such zoom lenses is how zooming photographing can be easily and quickly shifted or converted to macro-photographing and vice versa. Generally, an optical lens system of the zoom lens has a focusing lens assembly, a variable power (or a power changing) lens assembly, a compensating lens assembly and a master lens assembly, which are arranged in this order from front. When zooming is effected for zooming photographing, the zooming ring is rotated with respect to a mount securing lens barrel to move the variable power lens assembly and the compensating lens assembly while keeping a predetermined positional relationship therebetween. When focusing is effected, the focusing ring is rotated to move the focusing lens assembly.

On the other hand, in case of macro photographing, the focusing lens assembly and the compensating lens assembly have to be moved with a predetermined positional relationship, by the rotation of the same focusing ring. This requires the provision of any switching or shifting means of the movement of the focusing ring. However, prior art switching (shifting) means is complex and cannot be easily manufactured and tends to become inoperative or the cause maloperation. Furthermore, prior art switching means has a mechanical switch for converting the zoom photographing to the macro photographing and vice versa, which results in a decrease of operation efficiency. The present invention provides an improved zoom lens barrel having a macro photographing mechanism different from conventionally known macro photographing mechanisms. According to the present invention, there is provided a zoom lens barrel in which zooming and focusing can be effected by different actuation rings, wherein it comprises a focusing ring which is capable of (1) rotating for focusing for normal photographing, (2) axially moving at a shortest object distance position, and (3) further rotating for macro photographing after the axial displacement. A connecting ring connected to the focusing ring rotates together with the focusing ring, within a range of the rotational movement for focusing, to cause a focusing lens assembly to move. The connection between the focusing ring and the connecting ring is broken by the axial displacement of the focusing ring, so that the focusing ring comes into engagement with a macro helicoid ring. Therefore, when the focusing ring rotates for macro-photographing after the axial movement thereof, the whole lens assembly move together in an (optical) axial direction. The axial movement of the focusing ring can be effected, independently of an angular position of the zooming ring, i.e., a focal length of the zoom lens, and accordingly, switching between normal photographing and macro photographing can be effected by the axial movement of the focusing ring in the whole range of variable power of lenses.

The invention will be described below in detail with reference to the accompanying drawings, in which;

FIG. 2A is a longitudinal sectional view of the zoom lens barrel shown in a shortest object distance (photographing) position, according to the present invention;

FIG. 2B is a developed view of a main part when viewed from the arrow D in FIG. 2A;

Figure 1A:
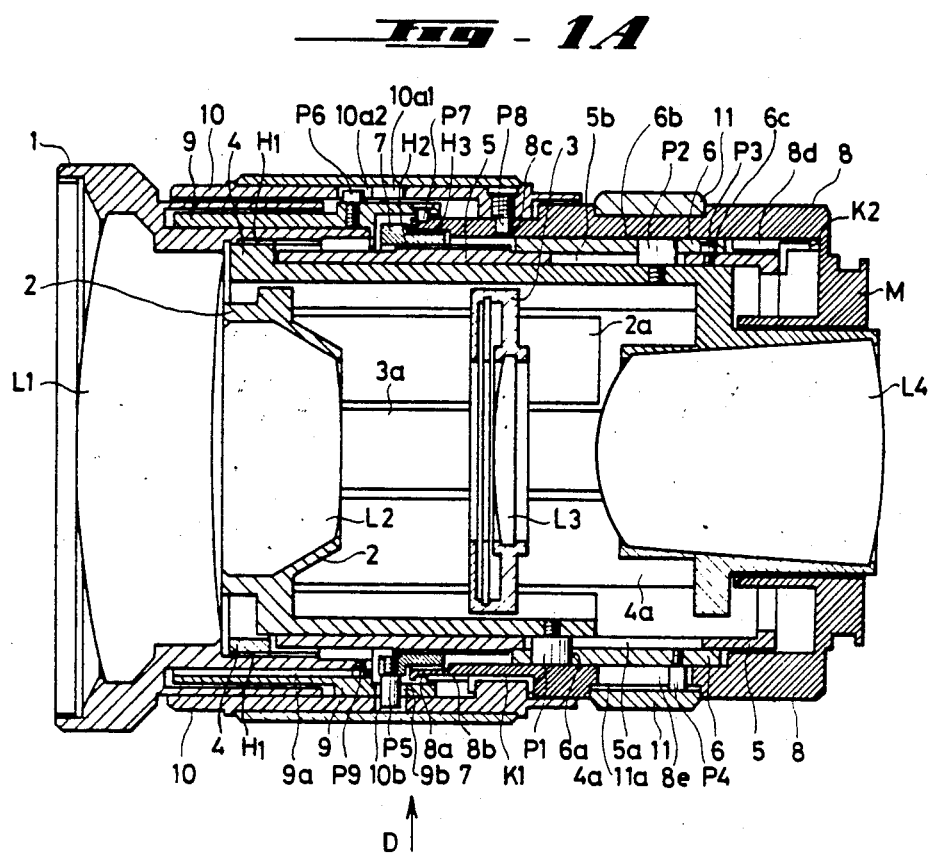
FIG. 1A is a longitudinal sectional view of a zoom lens barrel shown in an infinite object distance (photographing) position at a short focal length, according to the invention.

In FIG. 1, the optical system comprises first, second, third, and fourth lens assemblies L1, L2, L3, and L4 arranged in this order from front. When a power varying operation can be effected, the third lens assembly L3 is kept immovable, and the first and fourth lens assemblies L1 and L4 are moved together in the left hand direction in FIG. 1. Simultaneously, the second lens assembly L2 is moved in the opposite direction, i.e. in the right hand direction. As a result of these movements of the three lens assemblies, the lens system moves to a long focus position from a short focus position. Focusing can be effected by moving the first lens assembly L1 in the direction of the optical axis while keeping the second, third and fourth lens assemblies L2, L3 and L4 immovable. The macro-photographing can be effected by moving all of the four lens assemblies, together.

The present invention is directed to a lens barrel in which the above mentioned movements of the lens assemblies can be easily effected. The lens assemblies L1, L2, L3 and L4 are supported by and secured to lens frames 1, 2, 3, and 4, respectively. The first lens frame 1 is screw-engaged by the fourth lens frame 4 through a helicoid H1. The second lens frame 2 and the fourth lens frame 4 are slidably fitted in a support cylinder 5, and the third lens frame 3 is rigidly connected to the support cylinder 5. Leg portions 2a, 3a and 4a provided on the second, third and fourth lens frames 2, 3, and 4 are positioned so that they do not interfere with each other in the cylinder 5.

A mount ring 8 surrounds the outer periphery of the support cylinder 5. The mount ring 8 has at its rear end, a connecting mount M, which is adapted to be connected to a camera body (not shown). Between the rear ends of the mount ring 8 and the support cylinder 5 is arranged a cam cylinder 6 for providing a power (focal length) varing operation of the optical system. The cam cylinder 6 has a peripherally extending groove 6c which receives therein a pin P3 provided on the support cylinder 5 so that the cam cylinder 6 can only rotate with respect to the support cylinder 5. The cam cylinder 6 is provided, on its periphery, with two cam grooves 6a and 6b. The cam groove 6a receives therein a pin P1 provided on the second lens frame 2 and the cam groove 6b receives therein a pin P2 provided on the fourth lens frame 4, so that when the cam cylinder rotates, the lens frame 1, 2, and 4 move to achieve the aforementioned power varying operation, in accordance with profiles of the cam grooves 6a and 6b. The profiles of the cam grooves 6a and 6b depend on characteristics of the optical system and has no direct relationship to the present invention. Numerals 5a and 5b designate guide grooves on the support cylinder 5 for guiding the linear movement of the pins P1 and P2 without rotating the same.

The pin P4 provided on the outer periphery of the cam cylinder 6 projects outward through an escaping groove 8e of the mount ring 8, so that the projecting end thereof comes into a linear groove 11a of a zooming ring 11 which is fitted on the outer periphery of the mount ring 8 so as to only rotate. The linear groove 11a is adapted to directly transmit the rotational movement of the zooming ring 11 to the cam cylinder 6, even when the cam cylinder 6 is moved in the axial direction by the axial movement of the support cylinder 5.

Between the front ends of the support cylinder 5 and the mount ring 8 is located a macrohelicoid ring 7 which is connected to the support cylinder 5 by means of an inner helicoid H2 and to the mount-ring 8 by means of an outer helicoid H3, respectively. The support cylinder 5 is provided, on its rear end, with a key K2 which is fitted in an axial movement guiding groove 8d of the mount ring 8 so that the support cylinder 5 can only move in the axial direction without rotation. Therefore, when the macrohelicoid ring 7 rotates, the support cylinder 5 moves in the (optical) axial direction through the helicoid H2.

A connecting ring 9 is fitted in the first lens frame 1 which has a pin P7 fitted in a peripherally extending guide groove 8a of the mount ring 8 so that the connecting ring can only rotate. The connecting ring 8 is provided, on its inner periphery, with an axial movement guide groove 9a which receives therein a pin P9 provided on the first lens frame 1. Therefore, when the connecting ring 9 rotates, the first lens frame 1 rotates together, causing the axial movement of the first lens frame 1 through the helicoid H1.

A focusing ring 10 provided on the outer periphery of the front end of the mount ring 8 and on the outer periphery of the rear end of the first lens frame 1 selectively comes into engagement with the connecting ring 9 or the macrohelicoid ring 7 to rotate the same. The mount ring 8 has a focusing ring guide groove assembly 8C consisting of a peripherally extending focusing guide groove 8C1 for normal photographing, a peripherally extending macroguide groove 8C2 for macrophotographing which is spaced from the focusing guide groove 8C1 in the optical axis direction, and a linear movement guide groove 8C3 for connecting the shortest object distance position of the guide groove 8C1 and a starting end position of the guide groove 8C2. The focusing ring 10 has a pin P8 which is fitted in the guide groove assembly 8C of the mount ring 8. Furthermore, the focusing ring 10 has a switching guide groove 10a for receiving the pin P6 provided on the connecting ring 9, and a switching guide groove 10b for receiving the pin P5 provided on the macrohelicoid ring 7. The switching guide grooves 10a and 10b has peripherally extending escaping grooves 10a1, 10b1 and connecting grooves 10a2 and 10b2 which extend from the opposite ends of the respective escaping grooves 10a1 and 10b1 in the opposite axial directions, respectively. When the pin P8 of the focusing ring 10 is located in the focusing guide groove 8C1, the pin P6 is in the connecting groove 10a2 and the pin P5 is in the escaping groove 10b1, respectively. On the other hand, when the pin P8 is located in the macro guide groove 8C2, the pin P6 is in the escaping groove 10a1 and the pin P5 is in the connecting groove 10b2. Therefore, when the focusing ring 10 rotates along the focusing guide groove 8C1, the connecting ring 9 rotates together therewith by the engagement of the pin P6 in the connecting groove 10a2. At this time, the macrohelicoid ring 7 does not rotate since the pin P5 moves relative to and in the escaping groove 10b1. On the other hand, when the focusing ring 10 rotates along and by the macroguide groove 8C2, the macrohelicoid ring 7 rotates together therewith by the engagement of the pin P5 in the connecting groove 10b2. At this moment, the connecting ring 9 does not rotate since the pin P6 moves relative to and in the escaping groove 10a1. When the focusing ring 10 rotates and comes to the shortest object distance position, the pin P8 of the focusing ring 10 can come in and out of the linear movement guide groove 10C3 of the guide groove assembly 8C. The focusing ring 10 has a key K1 which can rotate relative thereto and which is fitted in the linear movement guide groove 8b of the mount ring 8. The connecting ring 9 has a lock groove 9C which receives therein the key K1 when the focusing ring 10 moves from the shortest object distance position along the linear movement guide groove 8C3. When the focusing ring 10 comes in a macrophotographing range, the key K1 comes into engagement with the lock groove 9C to lock the connecting ring 9 on the mount ring 8. It should be noted that even in this locking position, the focusing ring 10 is free to rotate.

The zoom lens barrel of the present invention operates as follows. To change the power of the lens barrel to the long focal length position from the shortest focal length position shown in FIG. 1A, the zooming ring 11 is rotated. As mentioned before, the rotation of the zooming ring 11 is transmitted to the cam cylinder 6 by means of the linear groove 11a and the pin P4, so that the cam cylinder 6 rotates by the same angular displacement as the zooming ring. As a result of the rotation of the cam cylinder 6, the fourth lens frame 4 and the first lens frame 1 are displaced in the left-hand direction and the second lens frame 2 is moved in the right-hand direction, in FIG. 1 by a known relationship between the pin P1, the linear movement guide groove 5a, the cam groove 6b, and the pin P2, the linear movement guide groove 5b, the cam groove 6b, to come to a long focal length position.

According to the present invention, switching between focusing and macro-photographing can be effected at any focal length position in the range of the variable power. In other words, the change in focal length has no influence on the switching operation mentioned above.

Figure 1B:
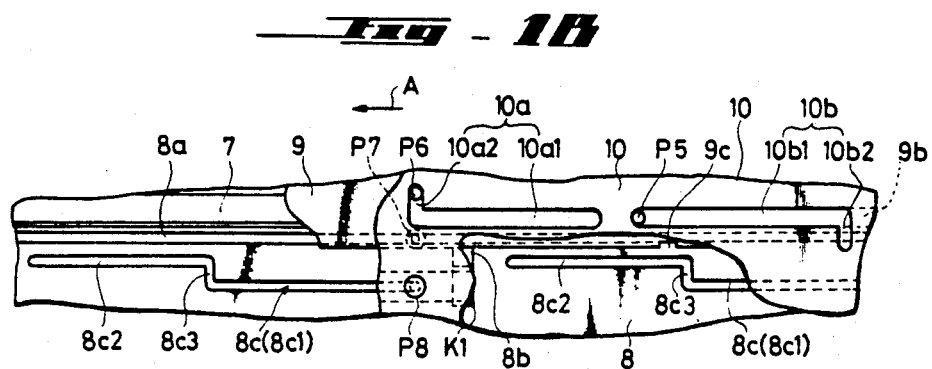
FIG. 1B is a developed view of a main part when viewed from the arrow D in FIG. 1A.

To effect focusing from the infinite object distance position shown in FIGS. 1A and 1B, the focusing ring 10 is moved in the left direction shown by the arrow A from the infinite object distance position shown in FIG. 1B. The focusing ring 10 rotates without moving in the optical axis direction by the engagement of the pin P8 in the focusing guide groove 8C1. The rotation of the focusing ring 10 causes the connecting ring 9 to rotate together by the engagement of the pin P6 in the connecting groove 10a2 of the switching guide groove 10a, so that the first lens frame 1 is rotated by the pin P9 which is fitted in the linear movement guide groove 9a. The first lens frame 1, when rotating, moves in the left direction by the helicoid H1, so that focusing corresponding to an object at a finite position can be obtained. During the rotational movement for normal focusing, the pin P5 moves in the escaping groove 10b1 of the switching guide groove 10b, and accordingly, the rotation of the focusing ring 10 is not transmitted to the macro-helicoid ring 7 so that the second through fourth lens frames 2, 3, and 4 do not move.

In FIGS. 2A and 2B, the focusing ring 10 is further rotated in the direction A to come to the shortest object distance position. As can be seen from FIG. 2B, the pin P8 provided on the focusing ring 10 comes to the end of the focusing guide groove 8C1 so that the rotation of the focusing ring 10 is stopped, and the pin P5 provided on the macro-helicoid ring 7 comes to the end of the escaping groove 10b1 so that the pin P5 can now enter the connecting groove 10b2. The key K1 comes in front of the lock groove 9C of the connecting ring 9 so that the key can enter the lock groove 9C. This is a position of completion of preparation for switching into the macro-photographing range.

Figure 3A:
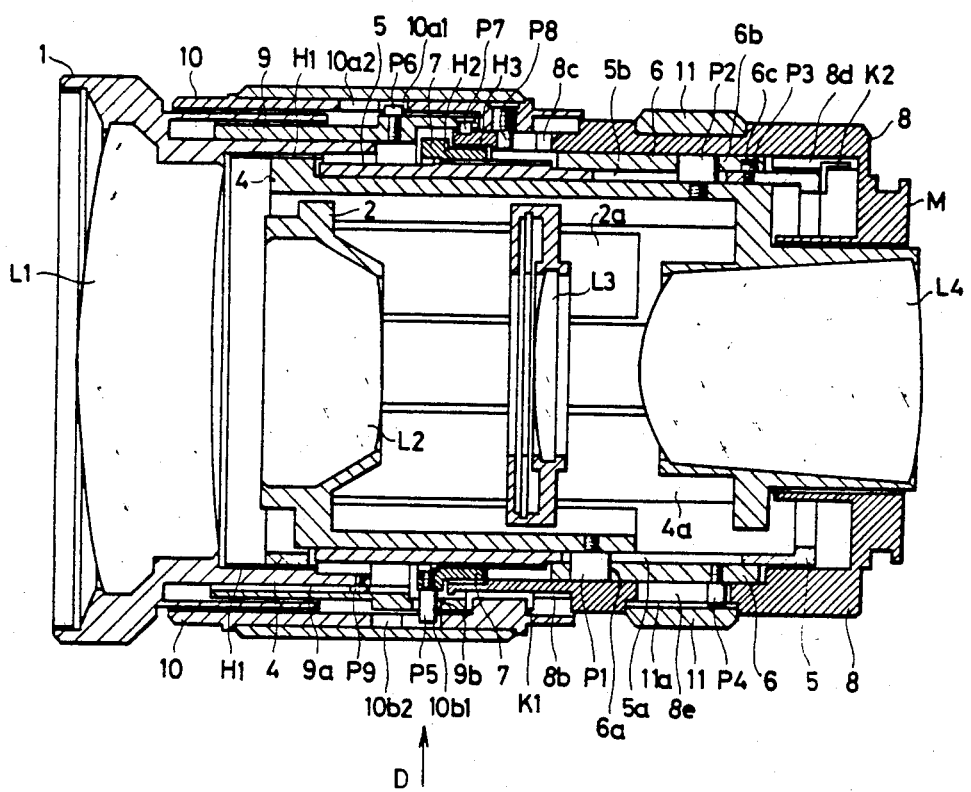
FIG. 3A is a longitudinal sectional view of the zoom lens barrel shown in a macro-photographing position.
Figure 3B:
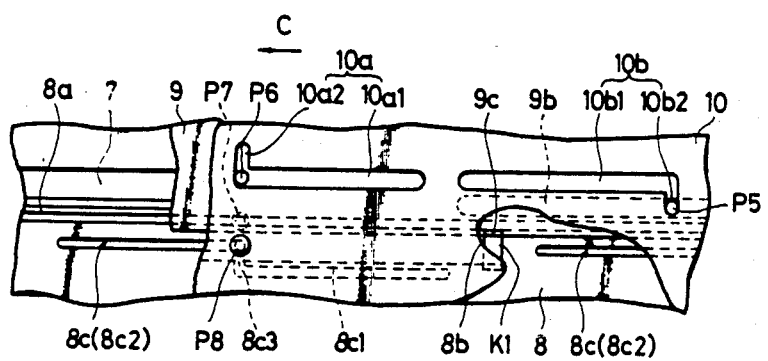
FIG. 3B is a developed view of a main part when viewed from the arrow D in FIG. 3A.

Switching into the macro-photographing from the position shown in FIGS. 2A and 2B is effected by moving the focusing ring 10 in the direction designated by the arrow B. The pin P8 of the focusing ring 10 moves in the direction B, i.e. in the optical axis direction, along the linear movement guide groove 8C3 of the focusing ring guide groove assembly 8C and comes into the macroguide groove 8C2, as shown in FIGS. 3A and 3B. Simultaneously, the pin P6 of the connecting ring 9 comes into the escaping groove 10a1 of the switching guide groove 10a to break the connection between the focusing ring 10 and the connecting ring 9. On the other hand, the pin P5 of the macrohelicoid ring 7 enters the connecting groove 10b2 of the switching guide groove 10b so as to rotate with the focusing ring 10. The key K1 comes into the lock groove 9C of the connecting ring 9 to lock the latter.

Figure 4A:
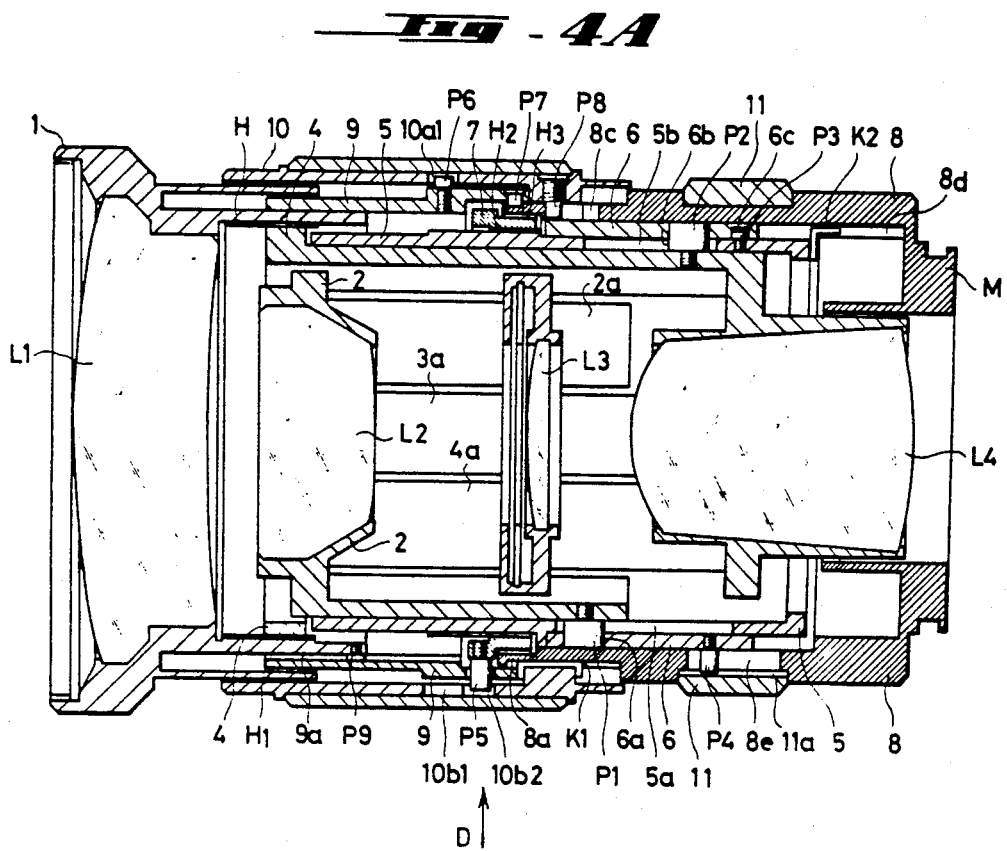
FIG. 4A is a longitudinal sectional view of the zoom lens barrel shown in a maximum macro-photographing position; and, FIG. 4B is a developed view of a main part when viewed from the arrow D in FIG. 4A.
Figure 4B:
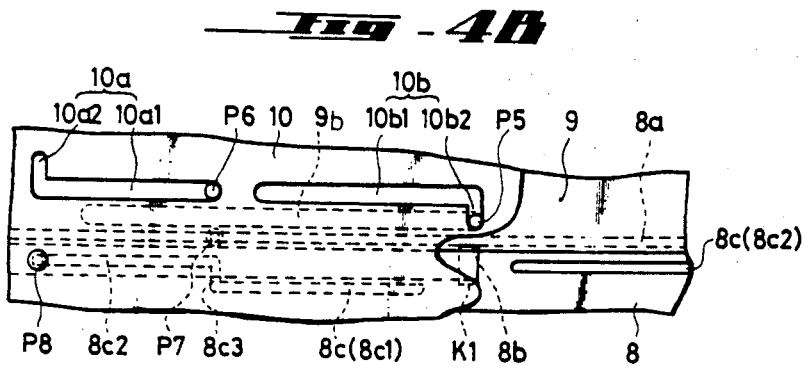

When the focusing ring 10 shown in FIG. 3B is moved (rotated) in the left direction (direction C), the macrohelicoid ring 7 rotates together with the focusing ring 10 because of the engagement of the pin P5 in the connecting groove 10b2, so that the support cylinder 5 is displaced in the left direction (FIG. 3A) without rotating, through the helicoids H2, H3, the key K2, and the linear movement guide groove 8d. The movement of the support cylinder 5 causes the cam cylinder 6 to move together therewith, because of the engagement of the pin P3 in the linear movement guide groove 6C. Thus, the first through fourth lens frames 1 through 4 move together, so that the first through fourth lens assemblies L1 through L4 move together while maintaining the spatial relationship therebetween. FIGS. 4A and 4B show the maximum magnification position in the macro-photographing range. In FIGS. 4A and 4B, the pin P8 of the focusing ring 10 reaches the terminal end of the macroguide groove 8C2 to limit the rotation of the focusing ring 10 and the whole lens systems are advanced by the maximum displacement. The macrohelicoid ring 7, when rotating, moves in the optical axis direction by the helicoid H3. The helicoid H3 has a lead smaller than that of the helicoid H2 to prevent the helicoid H3 to interfere with the above mentioned movement in the macro-photographing range. It is also possible to mount the macro-helicoid ring 7 onto the mount ring 8 so as to only rotate relative thereto without using the helicoid H2.

In the macro-photographing range mentioned above, the pin P6 of the connecting ring 9 moves in the escaping groove 10b1 of the switching guide groove 10b without being subject to the rotational force, and accordingly, only the first lens frame 1 can not move. Furthermore, since the connecting ring 9 is rigidly connected to the mount ring 8 by means of the key K1, the lock groove 9C, and the linear movement guide groove 8b, the first lens frame 1 is also indirectly connected to the mount ring 8 and accordingly, the first lens frame 1 can not rotate.

To switch the lens assemblies from the macro-photographing range into the normal photographing range, the operations mentioned above can be effected in the reversed order. Namely, in FIGS. 4A and 4B, the focusing ring 10 is moved (rotated) in the right direction to bring the pin P8 into contact with the end of the macroguide groove 8C2 (FIGS. 3A, 3B), and then the focusing ring 10 is advanced to bring the lens assemblies into the normal photographing position (FIGS. 2A, 2B) from the macro-photographing position. Further movement of the focusing ring 10 in the right direction causes the lens assemblies to the infinite object distance position (FIGS. 1A, 1B).

As can be understood from the above discussion, according to the present invention, switching between the macro-photographing position, the normal photographing position, and infinite object distance position can be effected, independently of the zooming position of the zoom ring. Furthermore, the switching into the macro-photographing position can be effected only by moving the focusing ring from the shortest object distance position in the axial direction, and accordingly no special switching means, such as a switch and/or switching button is necessary.

I claim:

1. A zoom lens barrel having lens assemblies, including a focusing lens assembly and a variable power lens assembly comprising a mount ring for connecting the lens barrel to a camera body, a zooming ring rotatable on the mount ring for adjusting the focal length of the lens assemblies, and a focusing ring rotatable on the mount ring for effecting focusing for normal photographing as well as for macro-photographing, the improvement comprising a guide means between the mount ring and the focusing ring for enabling the focusing ring to rotate for normal photographing, to move in the axial direction at the terminal position of the rotation in the shortest object distance position, and to further rotate after the axial movement for macro-photographing, a connecting ring which rotates to move only the focusing lens assembly, a macrohelicoid ring which rotates to move the whole lens assemblies while maintaining a predetermined spatial relationship therebetween, and a switching means for selectively connecting the connecting ring or the macrohelicoid ring to the focusing ring in accordance with the axial movement of the focusing ring, so that the connecting ring rotates together with the focusing ring within a range of the rotation for focusing of the focusing ring, and that the macrohelicoid ring rotates together with the focusing ring within a range of the rotation for macro-photographing of the focusing ring.

2. A zoom lens barrel according to claim 1, wherein said guide means comprises a focusing ring guide groove assembly provided on the mount ring, and a pin provided on the focusing ring to engage in the guide groove assembly.

3. A zoom lens barrel according to claim 2, wherein said focusing ring guide groove assembly comprises a peripherally extending focusing guide groove for normal photographing, a peripherally extending macroguide groove for macro-photographing, said macroguide groove being spaced in the axial direction from the focusing guide groove, and a linear movement guide groove for connecting an end portion of the focusing guide groove that corresponds to the shortest object distance position to a starting portion of the macroguide groove.

4. A zoom lens barrel according to claim 1, wherein said connecting ring is supported by the mount ring so as only to rotate and has a helicoid for rotatably carrying the focusing lens assembly.

5. A zoom lens barrel according to claim 1, wherein said macrohelicoid ring is provided, on its outer periphery, with an outer helicoid, and wherein said mount ring is provided, on its inner periphery, with an inner helicoid which is engaged by the outer helicoid of the macrohelicoid ring.

6. A zoom lens barrel according to claim 5, wherein said macrohelicoid ring is provided, on its inner periphery, with an inner helicoid, and wherein the barrel further comprises a supporting cylinder which has a helicoid coming into engagement with the inner helicoid of the macrohelicoid ring and which can move only in the axial direction, so that when said support cylinder moves in the axial direction, the lens assemblies move in the axial direction while maintaining the spatial relationship therebetween.

7. A zoom lens barrel according to claim 6, further comprising a cam cylinder which is provided on the outer periphery of the support cylinder, and which can be rotated on the support cylinder by the zooming ring to cause a relative displacement between the lens assemblies in order to adjust the focal length thereof, said cam cylinder being capable of axial movement together with the support cylinder for moving the lens assemblies together in the axial direction while keeping the spatial relationship between the lens assemblies.

8. A zoom lens barrel according to claim 1, wherein said switching means comprises two switching guide grooves formed in the focusing ring, a pin on the connecting ring, which is fitted in one of the switching grooves, and a pin on the macrohelicoid ring, which is fitted in the other switching groove.

9. A zoom lens barrel according to claim 8, wherein said switching guide grooves have peripherally extending escaping grooves and connecting grooves which extend from the opposite ends of the escaping grooves in the opposite axial directions, so that when the pin of the focusing ring is located in the focusing guide groove, the pin of the connecting ring and the pin of the macrohelicoid ring are in the connecting groove of one of the switching guide grooves and in the escaping groove of the other switching guide groove, respectively, and that when the pin of the focusing ring is located in the macroguide groove, the pin of the connecting ring and the pin of the macrohelicoid ring come into the escaping groove of said one switching groove and into the connecting groove of the other switching groove, respectively.

10. A zoom lens barrel according to claim 1, further comprising a key rotatably mounted to the focusing ring and received in the linear movement guide groove of the mount ring, and a lock groove formed in the connecting ring, so that when the focusing ring reaches the macro-photographing range, the key comes into engagement with the lock groove to lock the connecting ring on the mount ring.

* * * * *